March 18, 1958     B. J. SIMMONS     2,826,956
DIFFERENTIAL REFRACTOMETER OPTICAL SYSTEM
Filed Aug. 20, 1954
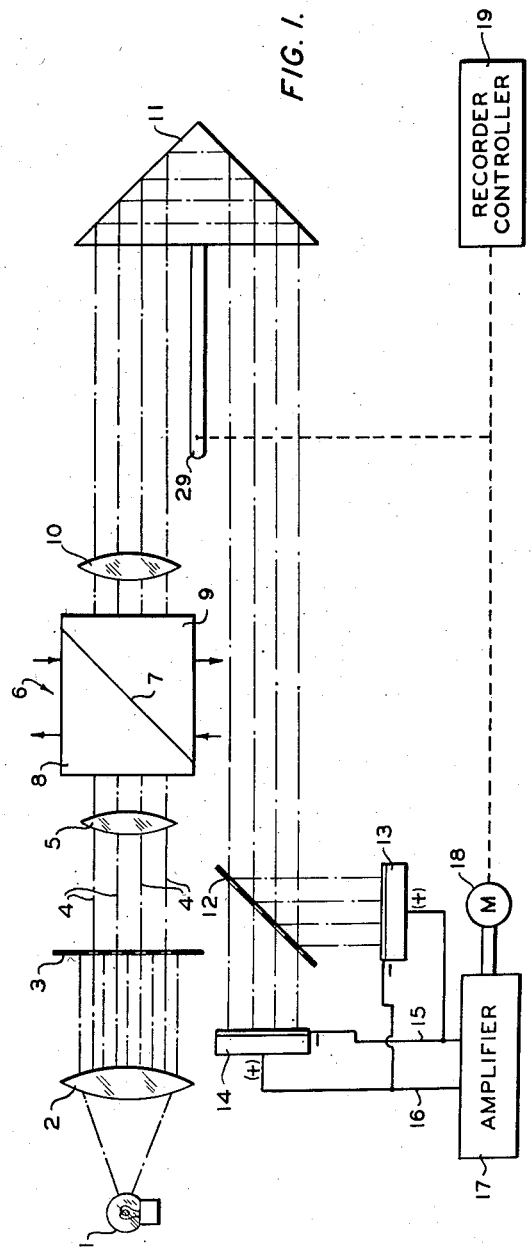
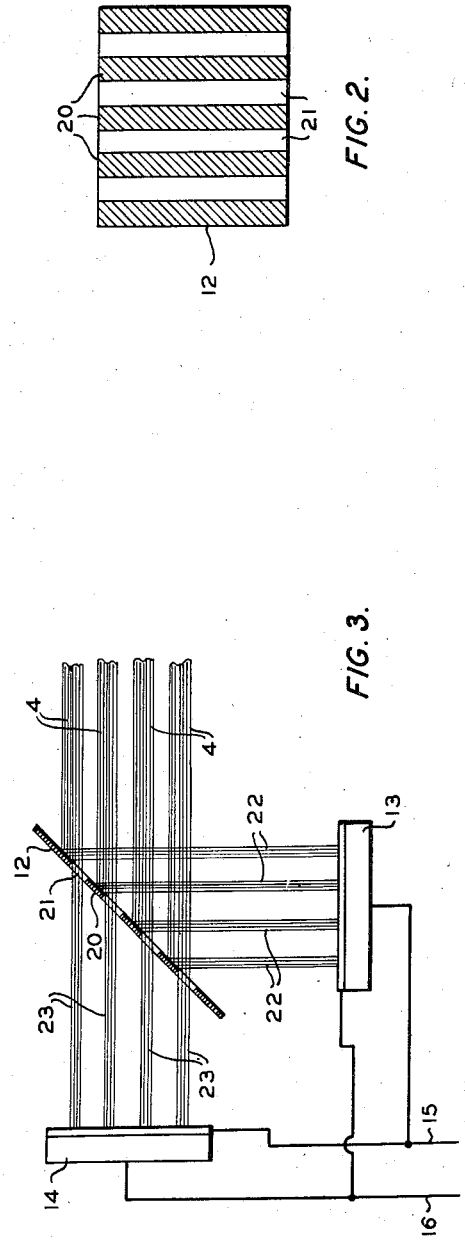
INVENTOR.
B. J. SIMMONS
BY *Hudson & Young*
ATTORNEYS United States Patent Office 2,826,956
Patented Mar. 18, 1958

2,826,956

DIFFERENTIAL REFRACTOMETER OPTICAL SYSTEM

Bill J. Simmons, Long Beach, Calif., assignor to Phillips Petroleum Company, a corporation of Delaware Application August 20, 1954, Serial No. 451,278

10 Claims. (Cl. 88—14)

This invention relates to an improved refractometer optical system. In one of its aspects it relates to a means for increasing photocell signal.

It is well known practice to control various types of industrial processes by an analysis of a sample stream removed from some point in the process, and by adjustment of a selected process variable in response to variations of a given property of the sample stream. One particular system of analysis and control is that of measuring the refractive index of the sample stream in comparison with a standard material. By comparing the refractive index of such a sample with a standard material, any variance in composition of the sample stream can be employed to actuate suitable control apparatus to adjust a selected process variable whereby the composition of the sample stream is returned to the desired value. In addition to the field of process control, measurement of the refractive index of a material finds many other applications. For example, the determination of molecular weights by light scattering requires a measurement of refractive index accurate to at least the fifth decimal place.

Differential refractometers and their uses for process control are known in the art. These refractometers contin a light source from which a beam is passed through a refractometer cell which contains a sample stream and a standard stream; i. e., a stream of known refractive index. The light beam leaving the refractometer cell either passes between two photocells striking neither, or is divided so as to strike both photocells equally. The outputs from the photocells are combined to oppose each other and the resulting current is amplified and used to drive a reversible motor. This motor is connected to a pivotable mirror or prism located in the light beams circuit and will rotate the mirror or prism changing the direction of the light beam until the output from the two cells exactly balance each other. The degree of rotation of the prism is directly related to the refractive index of the sample. Now if the motor is also connected to a recorder or recorder controller, the recorder by registering the position of the prism is a measure of refractive index. The recorder controller can also be made to actuate a variable control in response to a change registered by the controller so as to counteract this change and thereby maintain the desired refractive index. My invention is not directed to any particular control means, such apparatus being well known in the art.

One disadvantage of the optical system in the present refractometers of the type described is that small changes in refractive index will cause only minute changes in the light flux striking the two photocells so that the relative output from the two cells will differ by only a very small potential and therefore cells of very high sensitivity are required. Now if the light beam can be broken up into a plurality of beams so that each said beam will be deflected by the same amount and these beams are divided so as to strike two photo-cells, then the difference in flux will be multiplied by the number of beams utilized.

An object of this invention is to provide a means of increasing the sensitivity of a refractometer. Another object of this invention is to provide an optical system for use in a differential refractometer wherein a small change in refractive index of a sample will result in a relatively large change in light flux striking photo-cells. Still another object of this invention is to obtain greater sensitivity of a position detector. Still another object is to increase the useful life of photocells. Other objects and advantages will be obvious to those skilled in the art upon reading this specification and the attached claims.

My optical system comprises breaking up a light beam into a plurality of beams by passing the beam through a multiple slit or transmission grid, passing the plurality of beams through a differential refractometer cell, directing the plurality of beams upon a mirror grid whereon part of each beam is transmitted and strikes a photocell and the remaining part is reflected upon a second photocell.

If a mirror grid of equal spacing is inserted in the path of the light beams at a 45° angle, then in order that each beam will strike the grid in the same relationship to mirror and transmitted area, the spacing between the beam centers would be equal to $$\frac{1}{\sqrt{2}}$$

times the spacing on the mirror grid.

If in the above system the intensity of the light beams is E, the width of each light beam is L, and the number of beams is $n$; then a lateral displacement of the beams $\Delta X$ causes a change in light flux of $+nEL(\Delta X)$ on one photocell and $-nEL(\Delta X)$ on the other photocell. Thus, the output of the photocell system is $n$ times that of the single split system.

It is preferred that the mirror-grid spacing be greater than the full scale light throw so only one possible balance position can be obtained.

In many applications of refractometers, the photocell output/light displacement $$\frac{dI}{dX}$$

has been very small (as small as .01 microampere per division), and a slight weakening of a photocell has been equivalent to failure. The system herein described will increase the output of the photocell to a new value of $n$ $$\frac{dI}{dX}$$

and thereby alleviate the difficulty of photocell failure.

This invention can best be described by referring to the attached drawings of which Figure 1 is a schematic drawing showing my optical system in a refractometer.

Figure 2 is a view of a mirror grid, and

Figure 3 is an enlargement of that portion of Figure 1 showing the plurality of beams being split to fall upon the two photocells.

Referring to Figure 1, radiation from source 1 is directed through a lens 2 which condenses the radiation and the condensed beam is passed through grid (multiple slit) 3 which breaks up the beam into a plurality of parallel beam 4. These beams pass through collimating lens 5 to refractometer cell 6 in which the beams are deviated by an amount proportional to the difference in refractive indices of the two fluids contained therein. Refractometer cell 6 is formed from two complementary metal blocks which define an inner passage closed at both ends by transparent windows. A diagonal transverse plate 7 of transparent material is mounted between the two blocks separating the inner passage of cell 6 into two sections 8 and 9. Each section is provided with an inlet and an outlet conduit. One section is adapted to contain a fluid process stream to be analyzed, and the other section is adapted to contain a reference fluid, the index of refraction of which is to be compared to the index of refraction of the process fluid stream.

The beam of radiation leaving the refractometer cell 6 passes through focusing lens 10 and is directed upon pivotable mounted prisms 11. The beams of radiation are reflected within prism 11 and then imaged upon mirror grid 12 where one part of each beam is reflected to photocell 13 and the remaining part is transmitted to photocell 14. This mirror grid will be further described in connection with Figure 2. The two photocells are connected in opposition and the resulting current is fed by conduits 15 and 16 to amplifier 17. The output of the amplifier 17 is fed to reversible motor 18 which is mechanically connected to pivot arm 29 of prism 11 and to recorder controller 19. The recorder-controller can be utilized to change a process variable in response to changes so recorded.

Referring to Figure 2, an enlarged section of mirror grid is illustrated. This mirror grid is comprised of a plurality of parallel mirrors surfaces 20 interspaced by a plurality of parallel transparent sections 21.

Referring to Figure 3, the radiation beams 4 strike mirror grid 12 and one portion of each beam is reflected by mirror sections 20 forming beams 22 which impinge on photocell 13 and the remaining portion of beam 4 will pass through transparent sections 21 forming beams 23 which impinge on photocell 14. The outputs from the two cells are connected in opposition.

It is assumed for this discussion that the prism 11 (Figure 1) is so adjusted when the sample being analyzed has the desired refractive index that the outputs from the two cells 13 and 14 exactly balance each other. If each light beam 4 has a height X, a width L, total beam intensity E, and there are $n$ beams, then the light flux of beams 4 is $nELX$ and the light flux passing to each cell, assuming equal sensitivity, will be one half that value. If the refractive index of the sample changes sufficiently to displace the beams in an upward direction by a distance $\Delta X$, then the height of each beam transmitted will be increased by $\Delta X$ and the height of each beam being reflected will be decreased by $\Delta X$. That is the light flux striking one photocell will be increased by $+nEL(\Delta X)$ and the other will be decreased by a similar amount. Since we are interested in measuring differences, then it is not necessary that the height of each beam 23 be the same as each beam 22. That is, the change will be $nEL(\Delta X)$ regardless of the original flux values.

The mirror-grid spacing should be greater than the full-scale light throw (beam displacement) so only one possible balance position can be obtained. Mirror grid spacing should be slightly larger than beam width which will provide for full transmission or full reflection. It is also desirable to have the reflecting surfaces 20 and the transmitting spaces 21 of equal width.

My invention has been described in one of its preferred embodiments. Those skilled in the art will see many modifications which can be made without departing from the scope and spirit thereof. For example, mirrors can be used instead of the prism 11 as shown, the path of the light need not make a U turn as shown, but can make any other angle from the original path, but will generally make the U turn or a 90° angle for the sake of compactness and appearance. A rectangular prism can be used in place of the triangular prism as shown and the light beams kept in a straight line by rotation of the rectangular prism. Nor is it necessary to rotate the prism or mirror. In this latter case, the amplified output from the photocells can be used directly to control the recorder controller and the motor can be used to drive a variable resistance in the photocell output and, thereby, balance the two currents. The invention has been illustrated by the use of photo-voltaic cells, however, any other type photocell can be used such as photo-conductive or photoemissive cells.

I claim:

1. An analyzer comprising, in combination, a radiation source, first and second radiation detectors, a refractometer cell unit for refracting radiation beams passing therethrough in accordance with the refractive index of a sample fluid contained therein; means for passing a plurality of radiation beams from said radiation source through said refractometer cell; a grid mirror disposed at an angle in the path of said beams subsequent to passing through said refractometer so as to transmit a portion of each said beam to strike one of said radiation detectors and to reflect the remaining portion of each said beam so as to strike the second said radiation detector; and means for comparing the quantity of radiation incident upon said first and second detectors.

2. The analyzer of claim 1 wherein the mirror grid is comprised of a plurality of radiation reflective surfaces separated by radiation transmissive surfaces.

3. An analyzer comprising, in combination, a radiation source; means for collimating a plurality of beams of radiation from said source; a refractometer cell unit for refracting said beams in accordance with the difference in refractive indices between two fluids disposed in adjacent sections thereof; a mirror grid being comprised of a plurality of radiation reflective surfaces, said reflective surfaces being separated by a plurality of radiation transparent sections; a reflective means being rotatable about a fixed axis disposed in the path of said refracted beams so as to reflect the said beams on said mirror grid so that part of each beam is reflected by a radiation reflective surface and the remaining part of each beam passes through a transparent section of said mirror grid; a first radiation detector disposed to receive the reflected portion of the beams; a second radiation detector disposed to receive the remaining portion of the beams; means for comparing the quantity of radiation incident upon said first and second detectors; means actuated by said comparing means to rotate said reflector means about said axis until a predetermined relationship exist between the quantity of radiation incident upon said first and second detectors; and means to measure the rotation of said reflector means.

4. The analyzer of claim 3 wherein the radiation source is a source of visible light and the radiation detectors are photo-cells.

5. A differential refractometer comprising, in combination, a radiation source; means for collimating a plurality of radiation beams from said source; a refractometer cell unit for refracting said plurality of beams in accordance with the difference in refractive indices of two fluids disposed in adjacent sections thereof; a mirror grid; a first and second radiation detector; means for reflecting the refracted beams to direct said beams on said mirror grid so as to pass a part of each beam to said first detector and to reflect the remaining part of each beam to second said detector, said reflecting means including first and second reflectors positioned at right angles with one another and adapted to be rotated about a common axis on a line bisecting the angle between said reflectors; means for producing voltages representative of difference in radiation striking said detectors; a reversible motor driven by said voltage to rotate said reflectors until the voltage of said detectors is balanced; and means for indicating the rotation of said reflectors.

6. The differential refractometer of claim 5 wherein the radiation source is a source of visible light and the reflector means comprises a prism.

7. A differential refractometer comprising, in combination, a source of visible light; a first and second photocell; a collimating lens and a multi-slit grid for collimating a plurality of light beams from said source; a refractometer cell unit for refracting said plurality of beams in accordance with the difference in refractive indices of two fluids disposed in adjacent sections thereof, each said section having an inlet and an outlet; a fluid sample source; conduit means connecting said sample source to inlet of one of said adjacent sections; a source of fluid having a refractive index of predetermined value; conduit means connecting last said source of fluid to inlet of the second said adjacent section; a mirror grid, said mirror grid being comprised of alternating reflecting sections and transparent sections; light bending means for directing the refracted beams on to said mirror grid whereby part of each beam passes to said first photocell and the remaining part of each beam is reflected to the said second photocell, said light bending means being adapted to rotate about an axis; means for producing voltages representative of the difference in quantity of radiation striking said photocells; a reversible motor driven by said voltages, said motor being mechanically connected to said light bending means to rotate said light bending means until voltage of said photocells are equal; means for indicating the degree rotation of said light bending means; and means for controlling a variable of said sample source in response to said degree of rotation, the last said means being operably connected to said motor.

8. The differential refractometer of claim 7 wherein the mirror grid is at a 45 degree angle to the path of the plurality of light beams when said grid is reflecting one half of the incident light.

9. The differential refractometer of claim 8 wherein the spacing of the beam centers is $$\frac{1}{\sqrt{2}}$$

times the spacing on the mirror grid and the width of the sections of the mirror grid are larger than the height of the beams.

10. In combination, a radiation source, a pair of radiation detectors, a grid interposed between said source and said detectors, said grid having a series of elongated strip sections in side by side arrangement with alternate transparent and reflecting surfaces, means for focusing a plurality of radiation beams from said source on said grid so that one portion of the radiation passes through the transparent sections onto one detector and another portion of the radiation passes from the reflecting surfaces onto the other detector, said grid being inclined relative to the path of the light beams incident thereon, and means for effecting relative movement between said grid and said radiation beams to vary the proportions of radiation incident upon the two detectors.

References Cited in the file of this patent

UNITED STATES PATENTS

| | | |
|---|---|---|
| 2,483,102 | Pierson | Sept. 27, 1949 |
| 2,596,752 | Williams | May 13, 1952 |
| 2,602,861 | Albersheim | July 8, 1952 |
| 2,624,014 | Barstow | Dec. 30, 1952 |
| 2,771,149 | Miller et al. | Nov. 20, 1956 |

OTHER REFERENCES

Burton: "A modified schlieren apparatus for large areas of field," pages 907, 908, Journal of the Optical Society of America, vol. 39, November 1949.